United States Patent
Bannerman et al.

(10) Patent No.: US 10,273,088 B2
(45) Date of Patent: Apr. 30, 2019

(54) CONVEYOR BELT WITH LONGITUDINAL RAILS

(71) Applicant: Laitram, L.L.C., Harahan, LA (US)

(72) Inventors: Adam E. Bannerman, Mandeville, LA (US); Gurvinder Gandhi, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/759,354

(22) PCT Filed: Oct. 5, 2016

(86) PCT No.: PCT/US2016/055462
§ 371 (c)(1),
(2) Date: Mar. 12, 2018

(87) PCT Pub. No.: WO2017/062430
PCT Pub. Date: Apr. 13, 2017

(65) Prior Publication Data
US 2018/0257865 A1    Sep. 13, 2018

Related U.S. Application Data

(60) Provisional application No. 62/238,917, filed on Oct. 8, 2015.

(51) Int. Cl.
| | |
|---|---|
| *B65G 15/42* | (2006.01) |
| *B65G 15/62* | (2006.01) |
| *B65G 15/64* | (2006.01) |
| *B65G 23/06* | (2006.01) |

(52) U.S. Cl.
CPC .......... *B65G 15/42* (2013.01); *B65G 15/62* (2013.01); *B65G 15/64* (2013.01); *B65G 23/06* (2013.01)

(58) Field of Classification Search
CPC ........ B65G 15/42; B65G 23/06; B65G 15/56; B65G 15/64
USPC ......................................... 198/846, 834–835
See application file for complete search history.

(56) References Cited

U.S. PATENT DOCUMENTS

| | | | | |
|---|---|---|---|---|
| 3,478,138 | A |  | 11/1969 | Friesner |
| 3,545,822 | A | * | 12/1970 | Gremeret ............... B62D 55/24 |
| | | | | 305/179 |
| 3,941,238 | A |  | 3/1976 | Lapeyre |
| 4,138,011 | A |  | 2/1979 | Lapeyre |
| 4,323,533 | A |  | 4/1982 | Bramhall |
| 4,449,958 | A | * | 5/1984 | Conrad .................. B65G 15/42 |
| | | | | 198/834 |
| 5,470,293 | A | * | 11/1995 | Schonenberger ...... A63B 22/02 |
| | | | | 198/834 |

(Continued)

FOREIGN PATENT DOCUMENTS

| | | | | |
|---|---|---|---|---|
| GB | 1206765 A | | 9/1970 | |
| GB | 1243008 A | * | 8/1971 | ............. B65G 15/42 |

(Continued)

*Primary Examiner* — Mark A Deuble
(74) *Attorney, Agent, or Firm* — Catherine M. Bishop

(57) ABSTRACT

A positively-driven, low tension conveyor belt has longitudinal rails extending on the drive surface of the belt to prevent or reduce vibration. The longitudinal rails form channels separating lanes of drive teeth on the drive surface to form drive pockets. The longitudinal rails protrude past the drive teeth and ride on a conveyor belt carryway during operation.

18 Claims, 3 Drawing Sheets

(56) References Cited

U.S. PATENT DOCUMENTS

| | | | |
|---|---|---|---|
| 5,911,307 A * | 6/1999 | Kraft | B65G 15/64 198/846 |
| 7,210,573 B2 | 5/2007 | Mol | |
| 9,327,907 B1 * | 5/2016 | Schiltz | B65G 39/07 |
| 9,340,362 B2 | 5/2016 | Layne et al. | |
| 2005/0159262 A1 * | 7/2005 | Schoendienst | B65G 15/64 474/237 |
| 2007/0029171 A1 * | 2/2007 | Nemedi | B65G 15/42 198/841 |
| 2009/0032376 A1 * | 2/2009 | DeGroot | B65G 15/30 198/834 |
| 2010/0147656 A1 * | 6/2010 | Honeycutt | B65G 15/08 198/824 |
| 2013/0341163 A1 * | 12/2013 | Pertuit, Jr. | B65G 15/30 198/844.1 |

FOREIGN PATENT DOCUMENTS

| | | | | |
|---|---|---|---|---|
| JP | 2004-059271 A | | 2/2004 | |
| JP | 2013224188 A | * | 10/2013 | B65G 15/30 |

* cited by examiner

CONVEYOR BELT WITH LONGITUDINAL RAILS

RELATED APPLICATIONS

The present application claims priority to U.S. Provisional Patent Application No. 62/238,917, filed Oct. 8, 2015 and entitled "Conveyor Belt with Longitudinal Rails", the contents of which are herein incorporated by reference.

BACKGROUND

The invention relates generally to power-driven conveyors and more particularly to thermoplastic endless belts that are positively driven.

Low tension, direct drive conveyor belts are typically used in situations where hygiene and cleanliness are critically important. For example, in food processing plants such as those that process meat products for human consumption, low tension, direct drive belt conveyors are used to transport items. Sanitation is critically important and, therefore, the endless belts used in such conveyors are conventionally made of materials that can be hygienically cleaned, such as thermoplastics or stainless steel.

Low-tension, positively driven flat conveyor belts are especially useful in conveying food products. One such conveyor belt is disclosed in U.S. Pat. No. 7,210,573. That belt has on its underside a plurality of equally spaced, parallel teeth extending across the width of the belt perpendicular to the direction of belt travel. Sprockets engage the teeth to drive the belt. But, unless the belt is restrained laterally in some way, it can wander to one side or the other and jam or damage its outside edge. Physical restraints or guides can help keep the belt on track, but do so by means of friction, which increases the amount of power and the size of the motor required to drive the belt.

Often, conveyor belts are retrofitted into existing conveyor frames. A conveyor frame having horizontal structural members generally causes vibrations when used with a thermoplastic conveyor belt such as that disclosed in U.S. Pat. No. 7,210,573.

SUMMARY

The present invention provides a positively-driven, low tension conveyor belt having longitudinal rails extending on the drive surface of the belt to prevent or reduce vibration. The longitudinal rails form channels separating lanes of drive teeth on the drive surface to form drive pockets. The longitudinal rails protrude past the drive teeth and ride on a conveyor belt carryway during operation.

According to one aspect, a conveyor belt comprises a body extending in thickness from a top conveying surface to a bottom drive surface, and laterally from a first side edge to a second side edge, a plurality of drive teeth extending outward from the bottom drive surface at a selected belt pitch, a plurality of longitudinal rails extending outward from the bottom drive surface. The longitudinal rails extends substantially parallel to a direction of belt travel.

According to another aspect, a conveyor belt comprises a body extending in thickness from a top conveying surface to a bottom drive surface, and laterally from a first side edge to a second side edge. The bottom drive surface has a first lane of drive teeth, a first longitudinal channel, a second lane of drive teeth and a second longitudinal channel. The first lane of drive teeth comprises a series of drive teeth spaced in a direction of belt travel to define a drive pitch. The first longitudinal channel extends in the direction of belt travel adjacent to the first lane. The second lane of drive teeth is adjacent to the first longitudinal channel on an opposite side from the first lane of drive teeth. The second longitudinal channel is adjacent to the second lane of drive teeth.

According to another aspect, a conveyor belt comprises a body extending in thickness from a top conveying surface to a bottom drive surface, and laterally from a first side edge to a second side edge, a first drive tooth extending outward from the bottom drive surface and a rail extending outward from the bottom drive surface and in a direction substantially perpendicular to the first drive tooth. The rail is separated from a first end of the first drive tooth by a gap.

BRIEF DESCRIPTION OF THE DRAWINGS

These features and aspects of the invention, as well as its advantages, are described in more detail in the following description, appended claims, and accompanying drawings, in which:

DETAILED DESCRIPTION

Figure 1:
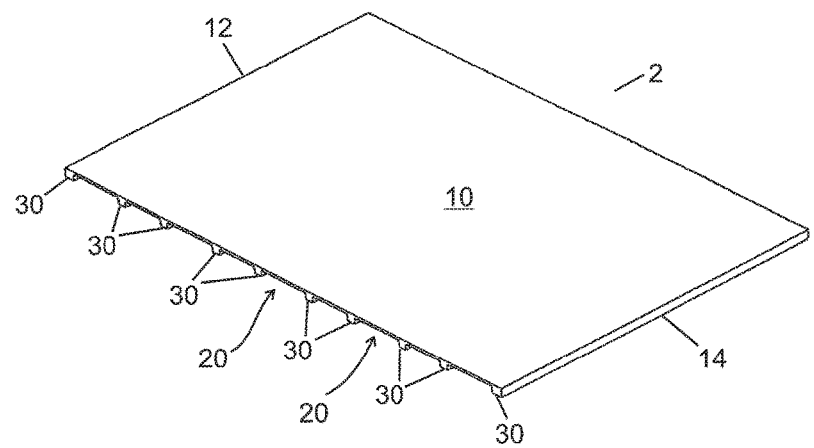
FIG. 1 is an isometric top view of a portion of a conveyor belt having longitudinal rails according to an embodiment of the invention.
Figure 2:
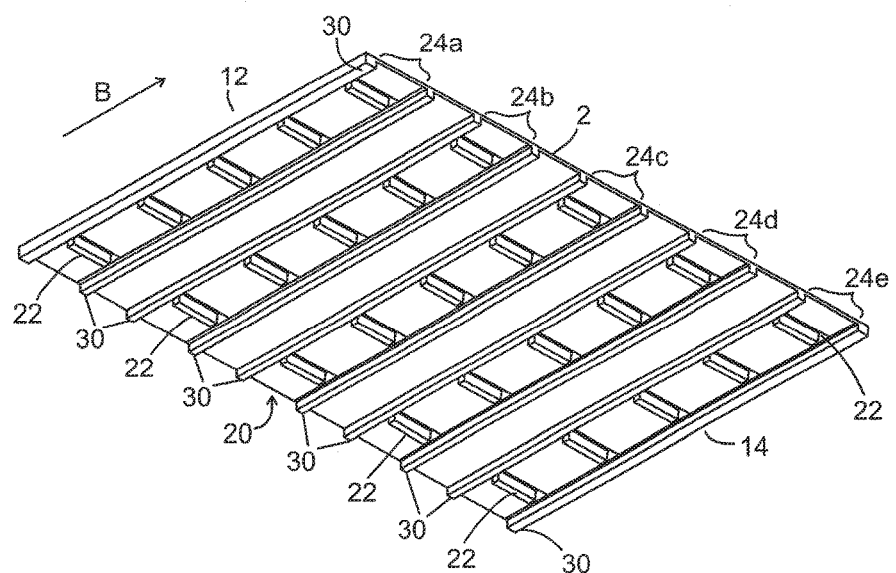
FIG. 2 is an isometric bottom view of the portion of the conveyor belt of FIG. 1.

The present invention provides a positively-driven, low tension conveyor belt having longitudinal rails to reduce vibrations. The invention will be described relative to certain illustrative embodiments, though those skilled in the art will recognize that the invention is not limited to the illustrative embodiments.

FIGS. 1-4 show a portion of a positively-driven, low tension conveyor belt 2 according to an embodiment of the invention. The conveyor belt is generally an endless belt trained around sprockets or other reversing elements. The belt may comprise a plurality of segments connected together to form an endless belt, or a single substrate with the ends joined together to form the endless belt. The illustrative belt is made of a resilient material, such as a thermoplastic polymer, an elastomer, or a rubber, and is flexible along its length. The conveyor belt can be made from any of a number of methods, e.g., milling, extrusion, compression molding and/or injection molding. The conveyor belt 2 can comprise multiple material molded together through a dual molding process. For example, the bottom of the belt can comprise a low friction material while the top of the belt can comprise a wear resistant material, an easy-release material or another type of material.

In another embodiment, the conveyor belt comprises a plurality of hingedly-connected modular plastic modules.

The illustrative conveyor belt has flexible body extending in thickness from a top conveying surface 10 for carrying conveyed products and an opposite inner drive surface 20. The conveying surface 10 preferably defines a continuous, i.e., seamless, load-carrying surface along the entire length of the belt. The conveying surface 10 shown is flat, but it could include contours, such as flights or perforations providing passages for drainage or airflow through the belt.

A series of drive teeth 22 extend outward of the drive surface 20 at regular intervals along the direction of belt travel B, defining the belt pitch P. The drive teeth are arranged in a series of spaced-apart lanes, and are configured to engage sprocket teeth. The illustrative belt segment 2 shows five drive tooth lanes 24a-e, though the invention is not so limited. The illustrative teeth 22 extend laterally, or perpendicular to a direction of belt travel B, though the invention is not so limited, and the drive teeth could alternatively extend obliquely to a direction a belt travel.

The drive surface 20 also includes a plurality of longitudinal rails 30 extending the length of the belt, or along at least a portion of the belt, in a direction that is parallel to the direction of belt travel B. The illustrative longitudinal rails 30 sandwich each drive tooth lane 24a-24e, with the outermost longitudinal rails 302, 304 formed along the side edges 12, 14 of the belt. Between the drive tooth lanes 24a-24e, the longitudinal rails define channels 34a-34d between the drive tooth lanes. The drive surface 20 of the belt forms a continuous top surface for the channels 34a-34d. The illustrative longitudinal rails 30 protrude past the drive teeth 22 to prevent the drive teeth from contacting frame members in a carryway upon which the conveyor belt travels. The longitudinal rails 30 allow the belt to ride upon carryway rollers or horizontal rails without added vibration. The drive teeth lanes 24a-24e form dedicates drive pockets for drive sprockets, defined by longitudinal rails 30. The drive pockets enable belt tracking via the sprockets. The channels 34a-34d can also or alternatively be used to track the belt using either idle rollers or carryway rails. Tracking could be enabled from below the belt, out of a product contact zone using these elements in the channel.

Figure 3:
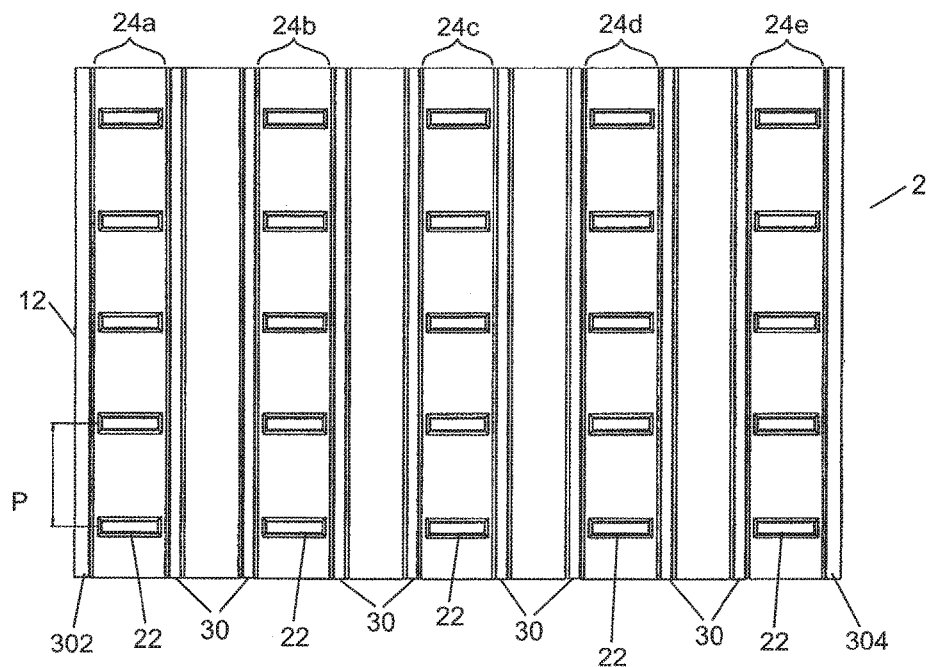
FIG. 3 is a bottom view of the portion of the conveyor belt of FIG. 1.

As shown in FIG. 3, the bottom drive surface 20 of the conveyor belt comprises a plurality of spaced apart drive tooth lanes 24a-24e alternating with and separated by longitudinal channels 34a-34d.

Figure 4:
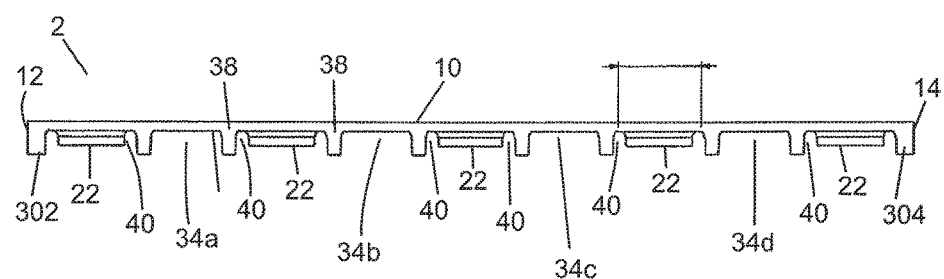
FIG. 4 is a front view of the portion of the conveyor belt of FIG. 1.

In the illustrative embodiment, the drive surface 20 includes gaps 40 between the ends of the drive teeth 22 and the longitudinal rails 30, as shown in FIG. 4. The gaps 40 facilitate sanitation and cleaning and allow the belt to bend more uniformly across the width.

Figure 5:
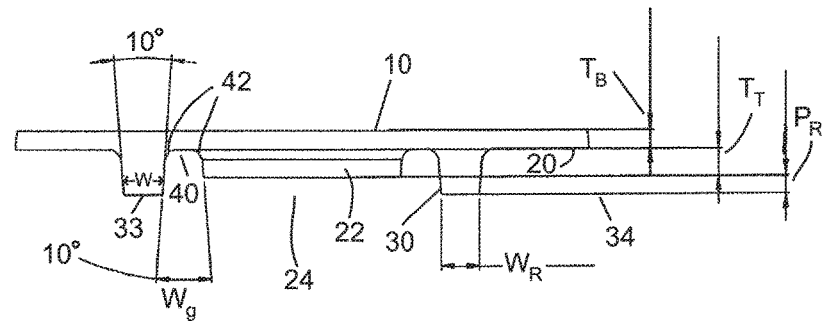
FIG. 5 is a detailed front view of a portion of the conveyor belt.
Figure 6:
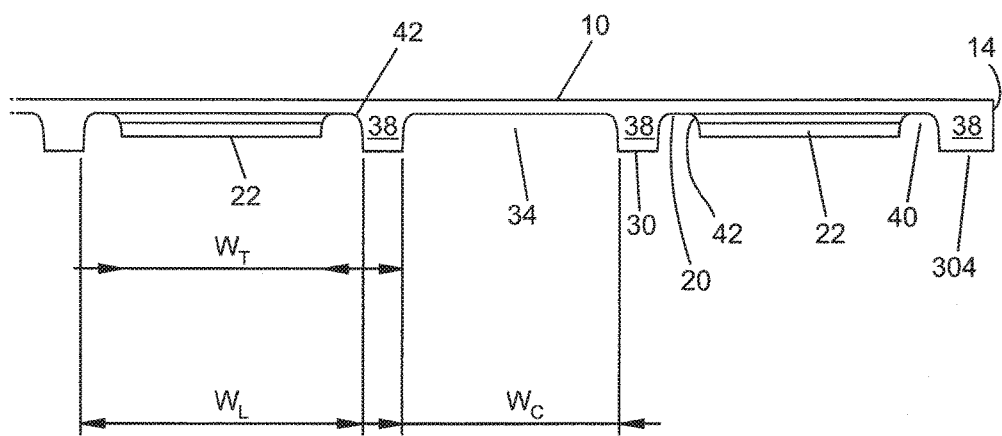
FIG. 6 is a detailed front view of an edge portion of the conveyor belt of FIG. 1.

Referring to FIGS. 5 and 6, which show details of the longitudinal rails 30 and teeth 22, in one embodiment, the gaps 40 have rounded surfaces 42 between the drive teeth 22 and drive surface 20 and between the longitudinal rail 30 and drive surface 20 to facilitate sanitation. The illustrative gaps 40 taper from the bottom towards the drive surface 20 by about 10°, though the invention is not so limited.

The illustrative longitudinal rails 30 taper in width from the drive surface 20 to an end face 33 at an angle of about 10°. In one embodiment, the width of the gaps Wg separating a rail from an end of a drive tooth 22 is about equal to the width of the rails Wr. The illustrative end face 33 is flat, though the invention is not so limited. The taper is not limited to the illustrative embodiment. The taper can be increased to facilitate bending of the belt, or decreased to form a more vertical side face to facilitate tracking. The configuration of the longitudinal rail 30 can be adapted to the particular application in which the belt is used. For example, the longitudinal rails 30 could have a more gradual taper to accommodate a small diameter sprocket, or the longitudinal rail could be steeper than the 10° taper to facilitate tracking under higher loads.

As shown in FIG. 5, the illustrative belt has a thickness Tb from the conveying surface 10 to the drive surface 20 of between about 0.05 and 0.1 inches. The drive teeth 22 protrude from the drive surface 20 by a distance Tt that is greater than Tb. The longitudinal rails 30 protrude past the end of the drive teeth 22 by a protruding distance Pr. In one embodiment, the protruding distance is approximately equal to the belt thickness Tb, though the invention is not so limited. The protruding distance can be proportional to the width of the drive pocket or longitudinal rail spacing. For example, the longitudinal rails 30 can protrude farther when the channels 34 or drive lanes 24 are wider to accommodate increased deflection of the belt under load and prevent contact between the drive teeth 22 and conveyor frame members.

Referring to FIG. 6, in one embodiment, the drive tooth lanes 24 are wider than the channels 34. For example, the drive tooth lane 24 may have a width WL that is between about 1.4 and about 1.6 inches and the width of the channel Wc may be between about 1.1 and about 1.2 inches. The width of each drive tooth $W_t$ may be between about 1.0 and about 1.1 inches. Therefore, the longitudinal rails 30 do not have a consistent spacing between the first edge 12 and second edge 14 of the belt, but rather an alternating spacing. The spacing of the longitudinal rails 30 can be changed to accommodate various accessories in the conveyor frame. The gaps between longitudinal rails 30 could alternatively be equal or different sizes to accommodate different roller and sprocket widths.

The longitudinal rails 302, 304 on the side edges 12, 14 also allow tracking of the conveyor belt, and strengthen the side edges. In addition, the end faces 38 of the longitudinal rails 30 provide added surface material to facilitate splicing, increasing belt pull.

The longitudinal rails 30 could alternatively be implemented in the drive surface of a modular plastic conveyor belt or another type of conveyor belt.

Although the invention has been described in detail with reference to a few exemplary versions, other versions are possible. So, as these few examples suggest, the scope of the claims is not meant to be limited to the versions described in detail.

What is claimed is:

1. A conveyor belt, comprising:
   a body extending in thickness from a top conveying surface to a bottom drive surface, and laterally from a first side edge to a second side edge;
   a plurality of drive teeth extending outward from the bottom drive surface at a selected belt pitch; and
   a plurality of longitudinal rails extending outward from the bottom drive surface and extending substantially parallel to a direction of belt travel,
   the plurality of drive teeth forming a plurality of spaced apart drive tooth lanes alternating with and separated by a plurality of longitudinal channels, each drive tooth lane bordered by a pair of longitudinal rails, and each longitudinal channel formed between another pair of longitudinal rails.

2. The conveyor belt of claim 1, wherein the longitudinal rails protrude past the drive teeth.

3. The conveyor belt of claim 2, wherein the longitudinal rails protrude past the drive teeth by a distance about equal to the thickness of the body.

4. The conveyor belt of claim 1, wherein the longitudinal rails taper in width from the bottom drive surface to an end face.

5. The conveyor belt of claim 1, wherein the ends of the drive teeth are separated from the longitudinal rails by gaps.

6. The conveyor belt of claim 1, wherein the drive teeth extend in a lateral direction across the bottom drive surface.

7. The conveyor belt of claim 1, wherein a first longitudinal rail is formed along the first side edge and a second longitudinal rail is formed along the second side edge.

8. The conveyor belt of claim 1, wherein the body is flexible.

9. A conveyor belt, comprising:
a body extending in thickness from a top conveying surface to a bottom drive surface, and laterally from a first side edge to a second side edge;
a first lane of drive teeth on the bottom drive surface, the first lane of drive teeth comprising a series of drive teeth spaced in a direction of belt travel to define a drive pitch;
a first longitudinal channel extending in the direction of belt travel adjacent to the first lane;
a second lane of drive teeth on the bottom drive surface adjacent to the first longitudinal channel on an opposite side from the first lane of drive teeth;
a second longitudinal channel adjacent to the second lane of drive teeth, and
a third lane of drive teeth adjacent to the second longitudinal channel on an opposite side from the second lane of drive teeth.

10. The conveyor belt of claim 9, wherein the longitudinal channels are defined by longitudinal rails extending from the bottom drive surface.

11. The conveyor belt of claim 9, further comprising a plurality of longitudinal rails, each longitudinal rail extending along a lane of drive teeth.

12. The conveyor belt of claim 11, wherein the longitudinal rails protrude past the drive teeth.

13. A conveyor belt, comprising:
a body extending in thickness from a top conveying surface to a bottom drive surface, and laterally from a first side edge to a second side edge;
a first drive tooth extending outward from the bottom drive surface; and
a first longitudinal rail extending outward from the bottom drive surface and in a direction substantially perpendicular to the first drive tooth and separated from a first end of the first drive tooth by a first gap;
a second longitudinal rail extending outward from the bottom drive surface and in a direction substantially parallel to the first longitudinal rail and separated from a second end of the first drive tooth by a second gap;
a third longitudinal rail spaced from the second longitudinal rail to form a longitudinal channel between the bottom drive surface, the third longitudinal rail and the second longitudinal rail;
a second drive tooth having a first end separated from the third longitudinal rail by a third gap; and
a fourth longitudinal rail separated from a second end of the second drive tooth by a fourth gap.

14. The conveyor belt of claim 13, wherein the first drive tooth and second drive tooth extend in a lateral direction.

15. The conveyor belt of claim 1, wherein the drive tooth lanes are wider than the longitudinal channels.

16. The conveyor belt of claim 13, wherein each gap has a width substantially equal to a width of a longitudinal rail.

17. The conveyor belt of claim 13, wherein the first and second longitudinal rail are separated by a distance that larger than a distance between the second and third longitudinal rails.

18. The conveyor belt of claim 13, further comprising a third drive tooth spaced from the first drive tooth by a selected drive pitch and a fourth drive tooth spaced from the second drive tooth by a selected drive pitch.

* * * * *